April 10, 1956
G. E. HENNING
2,740,989
EXTRUDERS
Filed Dec. 28, 1951
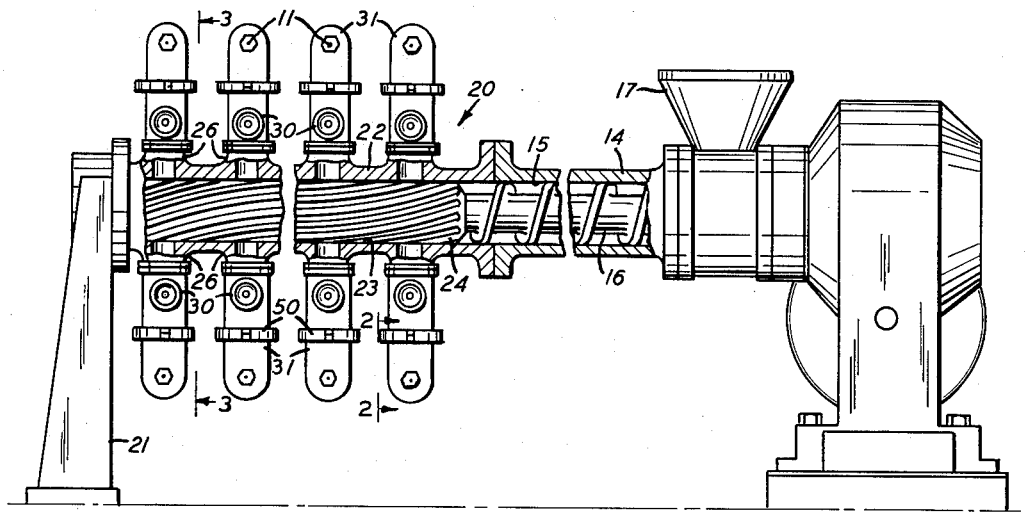
FIG. 1
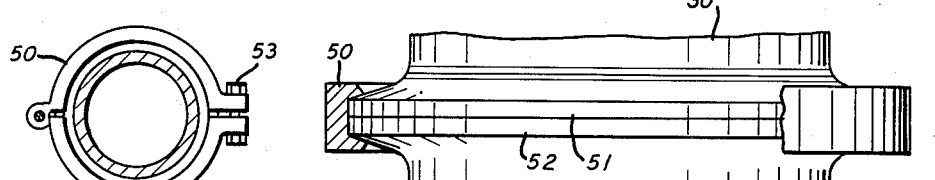
FIG. 4
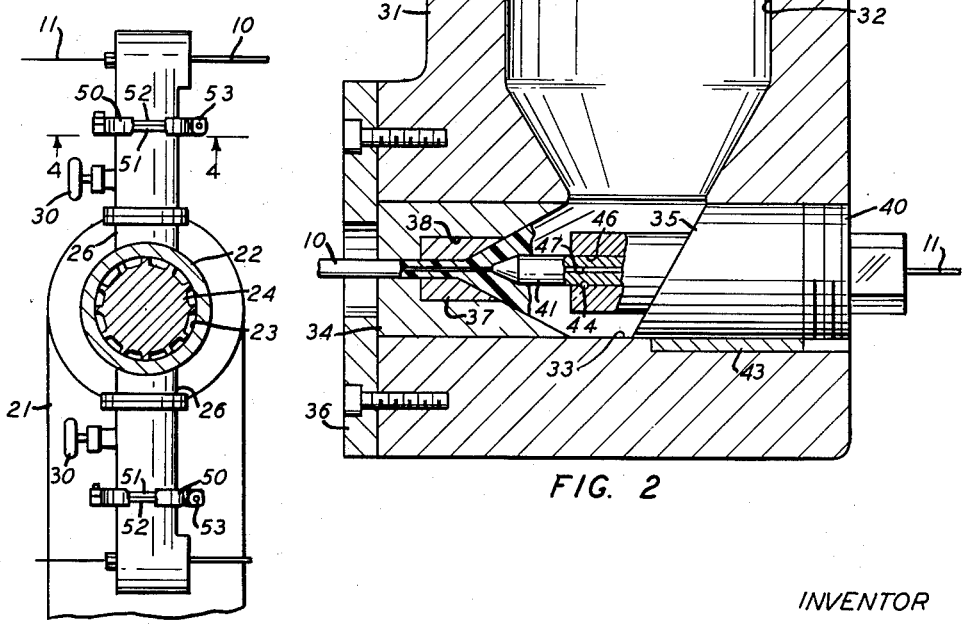
FIG. 3
FIG. 2
INVENTOR
G. E. HENNING
BY *[signature]*
ATTORNEY

United States Patent Office 2,740,989
Patented Apr. 10, 1956

2,740,989

EXTRUDERS

George E. Henning, Baltimore, Md., assignor to Western Electric Company, Incorporated, New York, N. Y., a corporation of New York Application December 28, 1951, Serial No. 263,752

4 Claims. (Cl. 18—13)

This invention relates to extruders, and more particularly to extruders for individually covering a plurality of conductors simultaneously.

In the manufacture of covered conductors, it has been the common practice to extrude each covering over single or double conductors with a single extruder. However, in covering wires having small conductive cores with relatively thin insulating coverings, it has not been economically feasible to provide extruders which do not extrude much larger capacities than that required to cover a single strand.

An object of the invention is to provide new and improved extruders.

Another object of the invention is to provide new and improved apparatus for extruding individual coverings on a plurality of conductors.

A further object of the invention is to provide multi-head extruders for simultaneously extruding individual coverings on a plurality of conductors.

An apparatus illustrating certain features of the invention may include an extruding cylinder having a plurality of branch lines. Extruding heads having core passages therethrough are connected to the discharge ends of each of the lines, and control means may be mounted in each of the lines for controlling each line individually.

A complete understanding of the invention may be obtained from the following detailed description of an apparatus forming a specific embodiment thereof, when read in conjunction with the appended drawings, in which Fig. 1 is a front elevation of an apparatus forming one embodiment of the invention;

Fig. 2 is an enlarged, fragmentary, side elevation, partly in vertical section of a portion of the apparatus shown in Fig. 1 taken along line 2—2 of Fig. 1;

Fig. 3 is an enlarged, fragmentary, vertical section taken along line 3—3 of Fig. 1, and Fig. 4 is a vertical section taken along line 4—4 of Fig. 3.

Referring now in detail to the drawings, there is shown therein a multi-head extruder for extruding individual coverings 10—10 on conductors 11—11 simultaneously. The extruder includes an extruding cylinder 14 having a bore 15 therein, in which is mounted a stock screw 16 having a tapered root. A plastic compound, including as the essential ingredient a thermoplastic, such as, for example, a copolymer of vinyl acetate and vinyl chloride, polyvinyl acetate, polyethylene, polyvinyl chloride, vinylidene chloride or the like, is inserted into the bore 15 through a hopper 17. The screw 16 advances the compound along the cylinder 14 toward the lefthand end thereof, as viewed in Fig. 1, and forces it into an extruding head 20 which is supported at one end by a standard 21.

The extruding head 20 is provided with a cylinder 22 having a bore 23 therein, in which a ribbed stock screw extension 24 is rotatably mounted and fits fairly closely. The extruding head 20 also includes branch conduits 26—26 leading from the top and the bottom of the cylinder 22, into which the plastic material is forced in extrudable condition by the pressure of the screw 16 and the extension 24 rigidly fastened to the screw. Individually adjustable reducing and shutting off valves 30—30 are connected to the branch conduits 26—26 and to flanged sub-heads 31—31, which are secured to the valves. Each sub-head 31 includes a passage 32 leading to a transverse passage 33, in which is mounted a die holder 34 and a core tube holder 35. A retaining plate 36 secures the die holder 34 in the passage 33, and a die 37 is mounted in a counterbore 38 formed in the die holder.

An annular, interiorly and exteriorly threaded plug 40 secures the core tube holder 35 in the passage 33, and the core tube holder holds a core tube 41 in properly oriented position with respect to the die 37. A key 43 keys the core tube holder 35 in the passage 33, and a pin 44 secures the core tube 41 against rotation relative to the core tube holder. The core tube holder is provided with a central passageway 46 aligned with a passageway 47 in the core tube through which the conductor 11 may be advanced.

Adjustable, hinged clamping rings 50—50 are closable to clamping positions on tapered flanges 51—51 on the valves 30 and tapered flanges 52—52 on the sub-heads 31—31 to seal the sub-heads to the valves. Bolts 53—53 provide the clamping forces on the rings 50—50. These elements form quick-detachable means for securing the sub-heads to the valves, and permit quick removal and replacement of a sub-head without stopping the operation of the other sub-heads, the valve 30 being closed to prevent leakage of compound during such an operation.

Operation

The conductors 11—11 are continuously advanced through the sub-heads 31—31, and the plastic compound is continuously advanced along the extruding cylinder 14 and is simultaneously worked and heated to a condition of high extrudability by the stock screw 16 and the stock screw extension 24. The stock screw 16 and the extension 24 force the highly plastic compound into the branch conduits 26—26 through the valves 30—30 and into the sub-heads 31—31, through which the compound flows around the core tubes 41—41 and through the dies 37—37 which form the compound into the coverings 10—10. The stock screw extension 24 advances the compound, and then tends to keep the pressures on the separate portions of the compound in the several sub-heads equal.

In the event of clogging of one of the sub-heads 31—31, and it is undersirable to shut down the entire extruder, the valve 30 supporting that sub-head is closed. The clamping ring 50 then is loosened, the clogged sub-head is removed for cleaning, and is replaced by a clean sub-head. This may be effected within a few minutes.

The above-described apparatus serves to extrude a multitude of coverings around a multitude of small wires at the same rate of speed for each wire and with the same size of extruder as normally is required to extrude a similar covering over one conductor. Consequently, large savings of equipment and floor space may be effected by this apparatus.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An extruder, which comprises an extruding cylinder extending horizontally, a hollow cylinder extension having a plurality of branch conduits extending from opposite sides of the extension mounted in a position extending horizontally from the cylinder with the branch conduits extending generally vertically, a plurality of extruding heads having T-shaped passages therein connected to the conduits, a stock screw mounted in the cylinder for advancing compound to the extension under pressure, and a stock screw extension for feeding the compound along the cylinder extension to equalize the pressures on the compound forced through the branch conduits.

2. An extruder, which comprises an extruding cylinder extending horizontally, a hollow cylinder extension having a plurality of branch conduits extending from opposite sides of the extension mounted in a position extending horizontally from the cylinder with the branch conduits extending generally vertically, a plurality of extruding heads having T-shaped passages therein connected to the conduits, a stock screw mounted in the cylinder for advancing compound to the cylinder extension under pressure, a stock screw extension for feeding the compound along the cylinder extension and tending to equalize substantially the pressures on the compound forced through the branch conduits, and a plurality of individually adjustable valves connected to the branch conduits.

3. An extruder, which comprises an elongated, horizontally extending extrusion cylinder having at one end thereof a plurality of branch conduits extending transversely from opposite sides thereof, a plurality of extruding heads having T-shaped passages therein connected to the conduits, and an extrusion screw rotatably mounted within the extrusion cylinder for advancing an extrudable compound along the cylinder under pressure toward the end provided with said branch conduits, the portion of the screw adjacent to the conduits communicating with the cylinder being provided with plasticizing means tending to equalize the pressures on the compound forced through the branch conduits.

4. An extruder, which comprises an elongated, horizontally extending extrusion cylinder having at one end thereof a plurality of branch conduits extending transversely from opposite sides thereof, a plurality of extruding heads having T-shaped passages therein connected to the conduits, an extension screw rotatably mounted within the extrusion cylinder for advancing an extrudable compound along the cylinder under pressure toward the end provided with said branch conduits, the portion of the screw adjacent to the conduits communicating with the cylinder being provided with plasticizing means tending to equalize the pressures on the compound forced through the branch conduits, and a plurality of individually adjustable valves connected to the branch conduits.

References Cited in the file of this patent

UNITED STATES PATENTS

| 1,100,002 | Van Ness | June 16, 1914 |
| 1,180,399 | Houben | Apr. 25, 1916 |
| 2,584,208 | Holmgren | Feb. 5, 1952 |